(12) United States Patent
Ahn et al.

(10) Patent No.: US 11,332,605 B2
(45) Date of Patent: May 17, 2022

(54) COMPOSITION OF THERMOPLASTIC ELASTOMER

(71) Applicants: Hyundai Motor Company, Seoul (KR); Kia Motors Corporation, Seoul (KR); GS Caltex Corporatoin, Seoul (KR)

(72) Inventors: Jin Gi Ahn, Seoul (KR); Boo Youn An, Busan (KR); Dae Sik Kim, Goeynggi-do (KR); Kyeong Hoon Jang, Seoul (KR); In Soo Han, Gyeonggi-do (KR); Seul Yi, Seoul (KR); Hyun Woo Kwon, Gyeonggi-do (KR); Byung Wook Kang, Daejeon (KR); Gyeong Suk Yoo, Daejeon (KR); Gi Young Hong, Daejeon (KR)

(73) Assignees: Hyundai Motor Company, Seoul (KR); Kia Motors Corporation, Seoul (KR); GS Caltex Corporatoin, Seoul (KR)

(*) Notice: Subject to any disclaimer, the term of this patent is extended or adjusted under 35 U.S.C. 154(b) by 2 days.

(21) Appl. No.: 16/592,230

(22) Filed: Oct. 3, 2019

(65) Prior Publication Data
US 2020/0392322 A1 Dec. 17, 2020

(30) Foreign Application Priority Data
Jun. 12, 2019 (KR) .......... 10-2019-0069580

(51) Int. Cl.
C08L 25/08 (2006.01)
C08L 23/16 (2006.01)
C08K 5/00 (2006.01)
C08K 5/01 (2006.01)

(52) U.S. Cl.
CPC ............. C08L 25/08 (2013.01); C08L 23/16 (2013.01); C08K 5/005 (2013.01); C08K 5/01 (2013.01)

(58) Field of Classification Search
CPC ....................................................... C08L 25/08
See application file for complete search history.

(56) References Cited

U.S. PATENT DOCUMENTS 6,906,144 B2 * 6/2005 Jeong ................... C08L 9/06
524/474
2004/0054040 A1 3/2004 Lin et al.

FOREIGN PATENT DOCUMENTS

EP 0433989 A2 6/1991
EP 0 651 009 B1 3/1998
EP 1 985 638 A1 10/2008
(Continued)

Primary Examiner — Arrie L Reuther
(74) Attorney, Agent, or Firm — Mintz Levin Cohn Ferris Glovsky and Popeo, P.C.; Peter F. Corless

(57) ABSTRACT

Disclosed is a thermoplastic elastomer composition having a superior low-temperature flexibility is provided. The thermoplastic elastomer composition may include an amount of about 10 to 15 wt % of a polypropylene-ethylene copolymer; an amount of about 70 to 85 wt % of a thermoplastic elastomer including an olefin-based thermoplastic elastomer and a styrene-based thermoplastic elastomer; an amount of about 5 to 10 wt % of a softener; an amount of about 3 to 5 wt % of a reinforcing agent; and an amount of about 1 wt % or less but greater than 0 wt % of a UV stabilizer based on the total weight of the thermoplastic elastomer composition.

13 Claims, 2 Drawing Sheets

| CONSTRUCTION INGREDIENT | POLYPROPYLENE-ETHYLENE COPOLYMER | OLEFIN-BASED THERMOPLASTIC ELASTOMER | STYRENE THERMOPLASTIC ELASTOMER | PARAFFIN OIL | BLOCK TYPE OLEFIN-BSED THERMOPLASTIC ELASTOMER | HYDROCARBON-BASED ADDITIVE | TPEE | UV Stabilizer | Carbon Black |
|---|---|---|---|---|---|---|---|---|---|
| COMPARATIVE EXAMPLE 1 | - | - | - | - | - | - | 100 | - | - |
| COMPARATIVE EXAMPLE 2 | 0 | 46 | - | - | 56 | - | - | 0.5PHR | 0.5PHR |
| COMPARATIVE EXAMPLE 3 | 13 | 63 | 24 | - | - | - | - | 0.5PHR | 0.5PHR |
| COMPARATIVE EXAMPLE 4 | 13 | 87 | - | - | - | - | - | 0.5PHR | 0.5PHR |
| COMPARATIVE EXAMPLE 5 | 13 | 63 | 16 | 8 | - | - | - | 0.5PHR | 0.5PHR |
| COMPARATIVE EXAMPLE 6 | 12 | 57 | 15 | 8 | - | 8 | - | 0.5PHR | 0.5PHR |
| EMBODIMENT 1 | 10 | 65 | 15 | 5 | - | 5 | - | 0.5PHR | 0.5PHR |
| EMBODIMENT 2 | 12 | 60 | 15 | 8 | - | 5 | - | 0.5PHR | 0.5PHR |
| EMBODIMENT 3 | 15 | 55 | 17 | 10 | - | 3 | - | 0.5PHR | 0.5PHR |
| EMBODIMENT 4 | 12 | 55 | 20 | 10 | - | 3 | - | 0.5PHR | 0.5PHR |

(56) References Cited

FOREIGN PATENT DOCUMENTS

| | | |
|---|---|---|
| EP | 3 272 790 A1 | 1/2018 |
| KR | 10-0307031 | 8/2001 |
| KR | 10-0475868 | 12/2003 |
| KR | 10-0506714 | 7/2006 |
| WO | 2005/080495 A1 | 9/2005 |

* cited by examiner

FIG. 1

| CONSTRUCTION | COMPOSITION (WT%) | | | | | | | | |
|---|---|---|---|---|---|---|---|---|---|
| INGREDIENT | POLYPROPYLENE-ETHYLENE COPOLYMER | OLEFIN-BASED THERMOPLASTIC ELASTOMER | STYRENE THERMOPLASTIC ELASTOMER | PARAFFIN OIL | BLOCK TYPE OLEFIN-BSED THERMOPLASTIC ELASTOMER | HYDROCARBON-BASED ADDITIVE | TPEE | UV Stabilizer | Carbon Black |
| COMPARATIVE EXAMPLE 1 | - | - | - | - | - | - | 100 | - | - |
| COMPARATIVE EXAMPLE 2 | 0 | 46 | - | - | 54 | - | - | 0.5PHR | 0.5PHR |
| COMPARATIVE EXAMPLE 3 | 13 | 63 | 24 | - | - | - | - | 0.5PHR | 0.5PHR |
| COMPARATIVE EXAMPLE 4 | 13 | 87 | - | - | - | - | - | 0.5PHR | 0.5PHR |
| COMPARATIVE EXAMPLE 5 | 13 | 63 | 16 | 8 | - | - | - | 0.5PHR | 0.5PHR |
| COMPARATIVE EXAMPLE 6 | 12 | 57 | 15 | 8 | - | 8 | - | 0.5PHR | 0.5PHR |
| EMBODIMENT 1 | 10 | 65 | 15 | 5 | - | 5 | - | 0.5PHR | 0.5PHR |
| EMBODIMENT 2 | 12 | 60 | 15 | 8 | - | 5 | - | 0.5PHR | 0.5PHR |
| EMBODIMENT 3 | 15 | 55 | 17 | 10 | - | 3 | - | 0.5PHR | 0.5PHR |
| EMBODIMENT 4 | 12 | 55 | 20 | 10 | - | 3 | - | 0.5PHR | 0.5PHR |

FIG. 2

| ITEM | UNIT | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 | COMPARATIVE EXAMPLE 6 | EMBODIMENT 1 | EMBODIMENT 2 | EMBODIMENT 3 | EMBODIMENT 4 | TARGET VALUE |
|---|---|---|---|---|---|---|---|---|---|---|---|---|
| SPECIFIC GRAVITY | g/cm³ | 1.2 | 0.88 | 0.88 | 0.88 | 0.88 | 0.88 | 0.88 | 0.88 | 0.88 | 0.88 | 0.88±0.2 |
| TENSILE STRENGTH | MPa | 12 | 1.4 | 1.1 | 4.3 | 0.7 | 1.6 | 1.3 | 1.5 | 1.8 | 1.1 | 1 OR MORE |
| FLEXURAL MODULUS (23°C) | MPa | 64 | 48 | 34 | 80 | 21 | 28 | 20 | 25 | 22 | 18 | 25 OR LESS |
| FLEXURAL MODULUS (-30°C) | MPa | 80 | 170 | 140 | 300 | 92 | 101 | 85 | 90 | 94 | 80 | 95 OR LESS |
| HARDNESS (Shore D) | D scale | 35 | 8 | 23 | 25 | 20 | 22 | 18 | 20 | 21 | 17 | 22 OR LESS |
| OPERATING FORCE (-30°C) | kgf | 0.7 | 2.7 | 1.8 | 3.1 | 0.99 | 0.88 | 0.8 | 0.9 | 0.96 | 0.75 | 1 OR LESS |
| PART FORMABILITY | SATISFIED/ DISSATISFIED | SATISFIED | DISSATISFIED | SATISFIED | SATISFIED | SATISFIED | SATISFIED | SATISFIED | SATISFIED | SATISFIED | SATISFIED | SATISFIED |
| SMELL | GRADE | 4 | 3 | 3 | 3 | 3 | 3 | 3 | 3 | 3 | 3 | 3 |

COMPOSITION OF THERMOPLASTIC ELASTOMER

CROSS REFERENCE TO RELATED APPLICATION

The present application claims priority of Korean Patent Application No. 10-2019-0069580 filed on Jun. 12, 2019, the entire contents of which is incorporated herein for all purposes by this reference.

TECHNICAL FIELD

The present invention relates to a composition of thermoplastic elastomer, and more particularly to an olefin-based thermoplastic elastomer composition having superior low-temperature flexibility.

BACKGROUND OF THE INVENTION

In general, a cup holder is provided on a floor console of a vehicle as a convenience item.

In the related art, a cover of the cup holder has been manufactured in a manner that a base material and a surface material are manufactured through double injection of two kinds of materials.

For example, the base material has resistivity caused by an external load, and in order to serve as a frame that maintains stiffness, the base material is manufactured using polycarbonate (PC) and acrylonitrile butadiene styrene (ABS) materials having superior stiffness and dimensions. The surface material has superior surface tactile, and in order to secure zebra type operability, the surface material is manufactured using ester-based thermoplastic elastomer (TPEE) having superior anti-corrosion and operability.

On the other hand, the TPEE that has been used to manufacture the surface material has an advantage that it has superior mechanical physical property, anti-corrosion, and low-temperature operability, but it has a disadvantage of high cost and high specific gravity (1.2 levels). Further, the TPEE smells a lot to cause limitations in applying the TPEE as a vehicle part from the viewpoint of smell reduction achievement, and because the TPEE is an aromatic polymer, it is vulnerable to light and it has limitations in implementing various color senses.

Although researches for replacing the TPEE by an olefin-based rubber have recently been made, the olefin-based rubber is unable to secure a cover operability at a low temperature (−30° C. level) actually required for use characteristics, and thus it causes a problem that it is not possible to open/close the cup holder cover at the coldest season.

Accordingly, inventors have continued researches for a thermoplastic olefin-based elastomer having a superior low-temperature flexibility to satisfy strengthened odor standards and lightweight using a low-cost olefin-based material.

The foregoing is intended merely to aid in the understanding of the background of the present invention, and is not intended to mean that the present invention falls within the purview of the related art that is already known to those of ordinary skill in the art.

SUMMARY OF THE INVENTION

In preferred aspects, provided is a thermoplastic olefin-based elastomer capable of securing operability with superior low-temperature flexibility, satisfying odor standards caused by volatile organic compounds (VOCs), and securing superior formability.

In an aspect of the present invention, a thermoplastic elastomer composition may include an amount of about 10-15 wt % of a polypropylene-ethylene copolymer; an amount of about 70 to 85 wt % of a thermoplastic elastomer including an olefin-based thermoplastic elastomer and a styrene-based thermoplastic elastomer; an amount of about 5 to 10 wt % of a softener; an amount of about 3 to 5 wt % of a reinforcing agent; and an amount of about 1 wt % or less but greater than 0 wt % of a UV stabilizer, all the wt % based on the total weight of the thermoplastic elastomer composition.

The polypropylene-ethylene copolymer may have a weight-average molecular weight of about 80,000 to 600,000 g/mol and a specific gravity in a range of about 0.89 to 0.91.

The polypropylene-ethylene copolymer may have a melt index of about 15 to 25 g/10 min (230° C., 2.16 kg).

The thermoplastic elastomer may suitably include an amount of about 55 to 65 wt % of the olefin-based thermoplastic elastomer and an amount of about 15 to 20 wt % of the styrene-based thermoplastic elastomer based on the total weight of the thermoplastic elastomer composition weight. For example, the thermoplastic elastomer may suitably be obtained by mixing an amount of about 55 to 65 wt % of the olefin-based thermoplastic elastomer and an amount of about 15 to 20 wt % of the styrene-based thermoplastic elastomer.

The olefin-based thermoplastic elastomer may suitably be in a polymerized form of an ethylene-butylene or ethylene-octene structure or in a polymerized form of a block copolymer structure.

The term "block copolymer" as used herein refers to a polymer including two or more homopolymer subunits, for example, by covalently bonding the two or more homopolymer subunits. Each of the homopolymers includes homogeneous monomers. For example, the olefin-based thermoplastic elastomer in a form of the block copolymer may include a first homopolymer subunit consisting of ethylene monomers and a second homopolymer subunit consisting of butylene or octene, and the first homopolymer subunit and the second homopolymer subunit may be covalently bonded.

The styrene-based thermoplastic elastomer may suitably be in a terpolymer A-B-A' type.

The term "terpolymer" as used herein refers to a copolymer including three types of monomers constituting a repeating unit, wherein the types of the monomers may be different or same. The styrene-based thermoplastic elastomer may suitably include a styrene monomer and two other distinguished monomers to form a terpolymer, and the repeating units of the styrene-based terpolymer may include two ends of A and A' monomer and the connecting unit of B monomer. Exemplary terpolymer may include, but not be limited to, SBS (Styrene-Butadiene-Styrene), SIBS (Styrene Isoprene Butadiene Styrene), SEBS (Styrene Ethylene/Butylene Styrene and SEPS (Styrene Ethylene/Propylene Styrene).

The softener may be paraffin oil, and the paraffin oil may have a weight-average molecular weight of about 700 to 900 g/mol.

The reinforcing agent may suitably include a hydrocarbon-based additive, and the hydrocarbon-based additive may have a weight-average molecular weight of about 4,000 to 6,000 g/mol, a glass transition temperature (Tg) of about 84° C., and a softening point of about 135 to 145° C.

The UV stabilizer may suitably include a hindered amine light stabilizer (HALS)-based additive having a molecular weight of about 2,000 or greater.

The UV stabilizer may further include primary antioxidant and secondary antioxidant.

Preferably, the thermoplastic elastomer composition may have a tensile strength of 1 about MPa or greater.

Preferably, the thermoplastic elastomer composition may have a flexural modulus of about 25 MPa or less that is measured at a temperature of 23° C. and a flexural modulus of about 95 MPa or less that is measured at a temperature of −30° C.

Preferably, the thermoplastic elastomer composition may have hardness (shore D) of about 22 or less.

Preferably, the thermoplastic elastomer composition may have an operating force of about 1 kgf or less that is measured at a temperature of −30° C.

Further, in an aspect of the present invention, provided is an interior material for a vehicle comprising the thermoplastic elastomer composition as described herein. For example, the interior material for a vehicle may be manufactured using the thermoplastic elastomer composition as described herein.

Also provided is a vehicle including the interior material as described herein.

According to an exemplary embodiment of the present invention, the low-cost olefin-based thermoplastic elastomer may be used as a vehicle interior material having an equal or superior physical property in comparison with the ester-based thermoplastic elastomer that is generally used as the vehicle interior material, and thus a cost saving effect can be expected.

Further, although the ester-based thermoplastic elastomer contains aromatic hydrocarbons including benzene rings to cause a vehicle indoor odor problem, the olefin-based thermoplastic elastomer may contain aliphatic polymers including no benzene rings, and thus an odor reduction effect can be expected.

Further, the ester-based thermoplastic elastomer is the polymer including the benzene ring, unstable $\pi$ bonds are decomposed to form radicals and yellowing of the components occurs, and thus the components are unable to be used as internal components. Further, in the case where a specific color pigment excluding a black color is added, such a light fastness deterioration phenomenon appears remarkably, and thus it is not possible to implement various colors. However, according to an exemplary embodiment of the present invention, when the olefin-based thermoplastic elastomer is used, the light fastness performance may be substantially improved in comparison with that of the ester-based thermoplastic elastomer, and thus it can be expected to implement various colors excluding the black color.

Other aspect of the invention are disclosed infra.

BRIEF DESCRIPTION OF THE DRAWINGS

The above and other objects, features and advantages of the present invention will be more clearly understood from the following detailed description taken in conjunction with the accompanying drawings, in which:

FIG. 1 is a table showing compositions in comparative examples and examples according various exemplary embodiments of the present invention; and FIG. 2 is a table showing physical properties and performances in various comparative examples and examples according various exemplary embodiments of the present invention.

DETAILED DESCRIPTION

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, regions, integers, steps, operations, elements and/or components but do not preclude the presence or addition of one or more other features, regions, integers, steps, operations, elements, components, and/or combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, preferred embodiments of the present invention will be described in more detail with reference to the accompanying drawings. However, the present invention is not limited to embodiments as disclosed hereinafter, but may be embodied in various different forms. However, the embodiments as described hereinafter are only for specific details provided to complete the present invention and to assist those of ordinary skill in the art to which the present invention pertains in a comprehensive understanding of the invention.

Preferably, the thermoplastic elastomer composition ("composition") may include a relatively low-cost olefin-based thermoplastic elastomer as a main material, and the kind and the contents of additives in the composition may be optimized. Accordingly, lightweight can be achieved, and prominent flexural modulus can be secured in order to improve operability at low temperature.

In an aspect, the thermoplastic elastomer composition may include an amount of about 10 to 15 wt % of a polypropylene-ethylene copolymer; an amount of about 70 to 85 wt % of a thermoplastic elastomer including an olefin-based thermoplastic elastomer and a styrene-based thermoplastic elastomer, an amount of about 5 to 10 wt % of a softener; an amount of about 3 to 5 wt % of a reinforcing agent; and 1 wt % or less but greater than 0 wt % of a UV stabilizer. All the wt % are based on the total weight of the thermoplastic elastomer composition.

The thermoplastic elastomer composition as described above may be applied as an interior material for a vehicle, such as a surface material of a cup holder applied to a floor console of the vehicle.

The reason why to limit ingredients and their composition range used in the present invention is as follows. Hereinafter, unless specially mentioned, "%" that is described as a unit of the composition range means wt %.

Polypropylene-Ethylene Copolymer in an Amount of about 10 to 15 wt %

The polypropylene-ethylene copolymer as used herein may be an element that is added to facilitate injection of the thermoplastic elastomer. Preferably, the mass mixing ratio of polypropylene and ethylene may be in a range of about 5-7:1. When the mass mixing ratio of polypropylene and ethylene is less than about 5:1, the mechanical strength and the heat resistance may deteriorate. When the mass mixing ratio is greater than about of 7:1, the mechanical physical property may be improved, but the flowability becomes worse to cause problems in productivity and formability. In this case, even after the injection molding, it may be difficult to reveal an elegant external appearance due to surface inferiority, such as flow mark.

On the other hand, the polypropylene-ethylene copolymer preferably may have a melt flow index of 15 to 25 g/10 min (230° C., 2.16 kg). When the melt flow index is less than about 15 g/10 min, the formability deteriorates due to reduction of the flowability, and when the melt flow index is greater than about 25 g/10 min, the impact strength deteriorates, and deformation occurs easily due to the impact.

Further, an amount of about 10 to 15 wt % of the polypropylene-ethylene copolymer mixture may be suitably include in the composition based on the total weight of the thermoplastic elastomer composition. When the content of the polypropylene resin is less than about 10 wt %, problems may occur in product formability and productivity, and when the content of the polypropylene resin is greater than about 15 wt %, it is difficult to secure low-temperature operability.

Preferably, the polypropylene-ethylene copolymer may have a weight-average molecular weight of about 80,000 to 600,000 g/mol and a specific gravity in the range of about 0.89 to 0.91.

Thermoplastic Elastomer Main Material in an Amount of about 70 to 85 wt %

The thermoplastic elastomer used herein as a main material may include the olefin-based thermoplastic elastomer and the styrene-based thermoplastic elastomer in order to simultaneously improve the normal-temperature flexibility and the low-temperature flexibility and to prominently maintain the mechanical physical property. For example, the thermoplastic elastomer may be a mixture of the olefin-based thermoplastic elastomer and the styrene-based thermoplastic elastomer.

The olefin-based thermoplastic elastomer may have a superior impact physical property, and thus it may be applied to a part that requires high impact strength. In addition, the styrene-based thermoplastic elastomer may be expandable by an oil to implement low hardness, and thus may supplement the physical property of the olefin-based thermoplastic elastomer.

The olefin-based thermoplastic elastomer may be used as the main material of the thermoplastic elastomer according to the present invention, and may be used in the form of not only a rubber polymerized into an ethylene-butylene or ethylene-octene structure that is the form of a general thermoplastic elastomer but also a rubber polymerized into a block copolymer form.

Preferably, the thermoplastic elastomer may include the olefin-based thermoplastic elastomer and the styrene-based thermoplastic elastomer, for example, the thermoplastic elastomer may be obtained by mixing an amount of about 55 to 65 wt % of the olefin-based thermoplastic elastomer and an amount of about 15 to 20 wt % of the styrene-based thermoplastic elastomer based on the total weight of the thermoplastic elastomer composition.

When the content of the olefin-based thermoplastic elastomer is less than about 55 wt %, the low-temperature flexibility may deteriorate. When the content of the olefin-based thermoplastic elastomer is greater than about 65 wt %, the product formability, productivity, and mechanical physical property may deteriorate.

Further, the styrene-based thermoplastic elastomer as used herein may improve the impact strength while minimizing the physical property deterioration, and it is preferable that the styrene-based thermoplastic elastomer is in a terpolymer A-B-A' type.

When the content of the styrene-based thermoplastic elastomer is less than about 15 wt %, it is difficult to secure the low-temperature flexibility. When the content of the styrene-based thermoplastic elastomer is greater than about 20 wt %, the manufacturing cost may be increased to loss a cost advantage.

Softener in an Amount of about 5 to 10 wt %

The softener as used herein may prevent the physical property from deteriorating through reduction of friction between materials, for example, paraffin oil may be suitably used as the softener.

The paraffin oil may act as the softener on the thermoplastic elastomer, and it may soften the thermoplastic elastomer. The softened thermoplastic elastomer may have advantages of easy formation, superior dustproof and superior waterproof. Further, the softened thermoplastic elastomer may show superior processability during formation through reduction of heat generation occurring during mixing.

The content of the paraffin oil that as the softener may suitably in an amount of about 5 to 10 wt % based on the total weight of the thermoplastic elastomer composition. When the content of the paraffin oil are less than about 5 wt %, the hardness of the product may be increased to deteriorate the low-temperature flexibility, and when the content of the paraffin oil is greater than about 10 wt %, oil bleed-out becomes severe to cause the product to be sticky.

Preferably, the paraffin oil may have a weight-average molecular weight of about 700 to 900 g/mol.

Reinforcing Agent in an Amount of about 3 to 5 wt %

The reinforcing agent as used herein may improve the mechanical physical property, such as tensile strength of the thermoplastic elastomer. For example, a hydrocarbon-based additive may be suitably used as the reinforcing agent.

The hydrocarbon-based additive may improve the mechanical physical property, and in particular, tensile strength physical property by increasing compatibility among the polypropylene-ethylene copolymer, the thermoplastic elastomer main material, and the paraffin oil.

The content of the hydrocarbon-based additive as the reinforcing agent may be an amount of about 3 to 5 wt % based on the total weight of the thermoplastic elastomer composition. When the content of the hydrocarbon-based additive is less than about 3 wt %, the compatibility among the polypropylene-ethylene copolymer, the thermoplastic elastomer main material, and the paraffin oil may deteriorate to cause reduction of the mechanical physical property. When the content of the hydrocarbon-based additive is greater than about 5 wt %, the physical property may be saturated to offset the effect, and thus only the cost increase may occur.

Preferably, the hydrocarbon-based additive may have a weight-average molecular weight of about 4,000 to 6,000 g/mol, a glass transition temperature (Tg) of about 84° C., and a softening point of about 135 to 145° C.

UV Stabilizer in an Amount of about 1 wt % or Less but Greater than 0 wt %

A hindered amine light stabilizer (HALS)-based additive may suitably have a molecular weight of about 2,000 or greater as the UV stabilizer.

The contents of the UV stabilizer may suitably be of about 1 wt % or less but greater than 0 wt % based on the total weight of the thermoplastic elastomer composition. When the content of the UV stabilizer is greater than about 1 wt %, an external appearance problem, such as surface stains, may occur, and thus it is difficult to obtain a material having an elegant external appearance and tactile impression.

On the other hand, the UV stabilizer may further include primary and secondary antioxidants, for example, which may be mixed with the HALS-based additive.

EXAMPLE

Hereinafter, the present invention will be described using comparative examples and embodiments.

FIG. 1 is a table showing compositions in various comparative examples and exemplary embodiments of the present invention, and FIG. 2 is a table showing physical properties and performances in various comparative examples and embodiments.

As illustrated in FIG. 1, a text sample was produced by preparing and molding a thermoplastic elastomer composition while the kinds and contents of respective ingredients were changed.

Comparative example 1 was produced using an ester-based thermoplastic elastomer (TPEE) that is a general cup holder cover, and the remaining comparative examples and embodiments, excluding comparative example 1, were produced by changing the contents of respective ingredients according to the present invention. However, the remaining comparative examples and exemplary embodiments excluding comparative example 1 were produced by fixing the contents of the UV stabilizer and the carbon black and by changing the remaining compositions.

Further, the test sample of the block type olefin-based thermoplastic elastomer used in comparative example 2 was produced using a block type ethylene-octene rubber (Low Tg produce, product name: Infuse).

Various kinds of evaluations were made using text samples according to the prepared comparative examples and embodiments. The measured evaluation items were specific gravity, tensile strength, flexural modulus at ambient temperature (23° C.), flexural modulus at low temperature (−30° C.), hardness (shore D), operating force at low temperature (−30° C.), part formability, and smell, and the result of the measurement was indicated in Table 2.

Various kinds of measurements were made on following conditions.

(1) Specific gravity: It was measured according to a method prescribed in ASTM D792.

(2) Tensile strength: It was measured at speed of 50 mm/min according to ASTM D638.

(3) Flexural modulus: It was measured at speed of 30 mm/min according to ASTM 790.

(4) Hardness: It was measured according to a method prescribed in ASTM D2240.

(5) Operating force: In order to measure the operating force of a cup holder cover, resistivity was measured in the unit of kgf during the operation of the cover using a push pull gauge at temperature of −30° C.

(6) Part formability measurement: During injection of the cup holder cover part, it was determined whether the part was completely formed or whether bending or surface sink occurred just after formation.

(7) Injected test sample surface: Flow marks and weld lines of a molded product were observed.

(8) Smell: A test sample was put in a dried 1L desiccator, was internally heated at temperature of 80° C. for 2 hours, and then was left for one hour, and smell was measured.

As can be seen in FIG. 2, in embodiments 1 to 4 satisfying the contents of ingredients prescribed in the present invention, the physical property values prescribed in the present invention were satisfied. For example, in embodiments 1 to 4, the specific gravity of 0.88±0.2 g/cm$^3$ was satisfied in all, and the tensile strength of 1 MPa or more was satisfied. The flexural modulus of 25 MPa or less that was measured at a temperature of 23° C. was satisfied, and the flexural modulus of 95 MPa or less that was measured at a temperature of −30° C. was satisfied. Further, the hardness (shore D) of 22 or less was satisfied, and the operating force of 1 kgf or less that was measured at a temperature of −30° C. was satisfied. Further, the part formability and the odor evaluation were satisfied.

However, comparative example 1 was a test sample using the ester-based thermoplastic elastomer (TPEE) that was a general cup holder cover material in the related art, and the specific gravity, the flexural modulus measured at a temperature of 23° C., the hardness, and the odor conditions were not satisfied.

Comparative example 2 was a test sample in which the styrene-based thermoplastic elastomer was not contained, but the block type olefin-based thermoplastic elastomer was contained, and the flexural modulus measured at 23° C., the flexural modulus measured at −30° C., the operating force, and the part formability conditions were not satisfied.

Comparative example 3 was a test sample in which the contents of the styrene-based thermoplastic elastomer was larger than the contents proposed in the present invention, and the flexural modulus measured at a temperature of 23° C., the flexural modulus measured at a temperature of −30° C., the hardness, and the operating force conditions were not satisfied.

Comparative example 4 was a test sample in which the styrene-based thermoplastic elastomer was not contained, but much olefin-based thermoplastic elastomer was contained, and in the same manner as the comparative example 3, the flexural modulus measured at a temperature of 23° C., the flexural modulus measured at a temperature of −30° C., the hardness, and the operating force conditions were not satisfied.

Comparative example 5 was a test sample in which the conditions of the present invention were satisfied, but the hydrocarbon-based additive that is the reinforcing agent was not used, and the tensile strength condition was not satisfied.

Comparative example 6 was a test sample in which the conditions of the present invention were satisfied, but the hydrocarbon-based additive as the reinforcing agent was more than that on the conditions according to the present invention, and the flexural modulus measured at a temperature of 23° C. and the flexural modulus measured at a temperature of −30° C. were not satisfied.

As can be seen from the above-described result, it could be confirmed that it was possible to improve the physical properties for the flexural modulus measured at a temperature of 23° C., the flexural modulus measured at a temperature of −30° C., the hardness, and the operating force through adjustment of the contents of the olefin-based thermoplastic elastomer and the styrene-based thermoplastic elastomer.

Further, it could be confirmed that it was possible to improve the physical property for the tensile strength through adjustment of the contents of the hydrocarbon-based additive that is the reinforcing agent.

Although the present invention has been described with reference to the accompanying drawings and the preferred embodiments, the present invention is not limited thereto, and it is limited by the accompanying claims. Accordingly, those of ordinary skill in the art will appreciate that various modifications, additions and substitutions are possible, without departing from the technical idea of the claims to be described later.

What is claimed is:

1. A thermoplastic elastomer composition comprising:
   an amount of about 10 to 15 wt % of a polypropylene-ethylene copolymer;
   an amount of about 70 to 85 wt % of a thermoplastic elastomer comprising an olefin-based thermoplastic elastomer and a styrene-based thermoplastic elastomer;
   an amount of about 5 to 10 wt % of a softener;
   an amount of about 3 to 5 wt % of a reinforcing agent; and
   an amount of about 1 wt % or less but greater than 0 wt % of a UV stabilizer,
   all wt % based on the total weight of the thermoplastic elastomer composition,
   wherein the thermoplastic elastomer comprises an amount of about 55-65 wt % of the olefin-based thermoplastic elastomer and an amount of about 15-20 wt % of the styrene-based thermoplastic elastomer based on the total weight of the thermoplastic elastomer composition,
   the thermoplastic elastomer composition has a flexural modulus of about 25 MPa or less that is measured at a temperature of about 23° C. and a flexural modulus of about 95 Mpa or less that is measured at a temperature of about −30° C., wherein the flexural modulus is measured at speed of 30 mm/min according to ASTM 790, and
   the thermoplastic elastomer composition has an operating force of about 1 kgf or less that is measured at a temperature of about −30° C., wherein the operating force is obtained from a resistivity that is measured in the unit of kgf using a push pull gauge at temperature of −30° C.

2. The thermoplastic elastomer composition according to claim 1, wherein the polypropylene-ethylene copolymer has a weight-average molecular weight of about 80,000 to 600,000 g/mol and a specific gravity in a range of about 0.89 to 0.91.

3. The thermoplastic elastomer composition according to claim 1, wherein the polypropylene-ethylene copolymer has a melt index of about 15 to 25 g/10 min (230° C., 2.16 kg).

4. The thermoplastic elastomer composition according to claim 1, wherein the olefin-based thermoplastic elastomer is in a polymerized form of an ethylene-butylene or ethylene-octene structure or in a polymerized form of a block copolymer structure.

5. The thermoplastic elastomer composition according to claim 1, wherein the styrene-based thermoplastic elastomer is in an A-B-A' terpolymer.

6. The thermoplastic elastomer composition according to claim 1, wherein the softener comprises a paraffin oil, and
   the paraffin oil has a weight-average molecular weight of about 700 to 900 g/mol.

7. The thermoplastic elastomer composition according to claim 1, wherein the reinforcing agent is a hydrocarbon-based additive, and
   the hydrocarbon-based additive has a weight-average molecular weight of about 4,000 to 6,000 g/mol, a glass transition temperature (Tg) of about 84° C., and a softening point of about 135 to 145° C.

8. The thermoplastic elastomer composition according to claim 1, wherein the UV stabilizer comprises a hindered amine light stabilizer (HALS)-based additive having a molecular weight of about 2,000 or greater.

9. The thermoplastic elastomer composition according to claim 8, wherein the UV stabilizer further comprises a primary antioxidant and secondary antioxidant.

10. The thermoplastic elastomer composition according to claim 1, wherein the thermoplastic elastomer composition has a tensile strength of about 1 MPa or greater.

11. The thermoplastic elastomer composition according to claim 1, wherein the thermoplastic elastomer composition has hardness (shore D) of about 22 or less.

12. An interior material for a vehicle comprising a thermoplastic elastomer composition according to claim 1.

13. A vehicle comprising an interior material according to claim 12.

* * * * *